(12) United States Patent
Silvanus et al.

(10) Patent No.: US 10,183,446 B2
(45) Date of Patent: Jan. 22, 2019

(54) COMPONENT HAVING AN INTEGRAL BOND AND A JOINING METHOD

(71) Applicant: Airbus Defence and Space GmbH, Ottobrunn (DE)

(72) Inventors: Juergen Silvanus, Unterhaching (DE); Meinhard Meyer, Munich (DE); Michael Juergens, Munich (DE)

(73) Assignee: Airbus Defence and Space GmbH (DE)

( * ) Notice: Subject to any disclaimer, the term of this patent is extended or adjusted under 35 U.S.C. 154(b) by 50 days.

(21) Appl. No.: 14/974,867

(22) Filed: Dec. 18, 2015

(65) Prior Publication Data
US 2016/0176102 A1 Jun. 23, 2016

(30) Foreign Application Priority Data
Dec. 19, 2014 (EP) .................... 14004302

(51) Int. Cl.
*B32B 27/08* (2006.01)
*B32B 7/04* (2006.01)
(Continued)

(52) U.S. Cl.
CPC ............ *B29C 65/022* (2013.01); *B29C 65/02* (2013.01); *B29C 65/0681* (2013.01);
(Continued)

(58) Field of Classification Search
CPC ... B32B 7/04; B32B 2250/02; B32B 2250/24; B32B 27/08; B32B 2605/18; B29C 66/71; B29C 66/43; B29C 66/74141; B29C 66/836; B29C 66/91411; B29C 65/022; B29C 65/72; B29C 65/1122; B29C 65/1142; B29C 65/06; B29C 66/3034; B29C 66/81422; B29C 66/81429;
(Continued)

(56) References Cited

U.S. PATENT DOCUMENTS 2,914,846 A 12/1959 Baldus et al.
3,431,157 A 3/1969 Mack
(Continued)

FOREIGN PATENT DOCUMENTS

EP 1941987 A1 7/2008
EP 2762731 A1 * 8/2014 ............ B23K 20/12
(Continued)

OTHER PUBLICATIONS

Ahmadi H et al: "Influence of Pin Profile on Quality of Friction Stir Lap Welds in Carbon Fiber Reinforced Polypropylene Composite" International Journal of Mechanics and Applications, Bd.2, Nr.3, Jan. 1, 2012 (Jan. 1, 2012).
(Continued)

*Primary Examiner* — Camie S Thompson
(74) *Attorney, Agent, or Firm* — Lerner, David, Littenberg, Krumholz & Mentlik, LLP

(57) ABSTRACT

A welding method for producing an integral bond of fiber-reinforced plastics parts includes a welding head penetrating one of the plastics parts. The method includes reinforcing at least a first plastics part by a plurality of directional fibers. The re-inforcing fibers reorient themselves within the connection region without severing or breaking.

24 Claims, 2 Drawing Sheets

(51) Int. Cl.
  *B29C 65/02* (2006.01)
  *B29C 65/06* (2006.01)
  *B29C 65/72* (2006.01)
  *B29C 65/00* (2006.01)
  *B29C 65/14* (2006.01)

(52) U.S. Cl.
  CPC .......... *B29C 65/72* (2013.01); *B29C 66/1122* (2013.01); *B29C 66/1142* (2013.01); *B29C 66/3034* (2013.01); *B29C 66/43* (2013.01); *B29C 66/72141* (2013.01); *B29C 66/7392* (2013.01); *B29C 66/81422* (2013.01); *B29C 66/81429* (2013.01); *B29C 66/836* (2013.01); *B29C 66/91411* (2013.01); *B29C 66/91413* (2013.01); *B29C 66/91935* (2013.01); *B32B 7/04* (2013.01); *B32B 27/08* (2013.01); *B29C 65/1412* (2013.01); *B29C 66/71* (2013.01); *B29C 66/919* (2013.01); *B32B 2250/02* (2013.01); *B32B 2250/24* (2013.01); *B32B 2605/18* (2013.01)

(58) Field of Classification Search
  CPC ............ B29C 66/919; B29C 66/91935; B29C 65/0681; B29C 65/02; B29C 65/1412
  USPC ........................................ 156/73.5; 428/298.4
  See application file for complete search history.

(56) References Cited

U.S. PATENT DOCUMENTS

| | | | |
|---|---|---|---|
| 3,449,199 A | 6/1969 | Mead | |
| 3,895,160 A | 7/1975 | Seeman, II | |
| 3,940,524 A | 2/1976 | Hoppe et al. | |
| 3,983,282 A | 9/1976 | Seemann, III | |
| 4,125,981 A | 11/1978 | MacLeod et al. | |
| 4,167,953 A | 9/1979 | Carlstrom | |
| 4,336,221 A | 6/1982 | Garabedian | |
| 4,350,728 A | 9/1982 | Huang et al. | |
| 4,528,051 A | 7/1985 | Heinze et al. | |
| 4,911,683 A | 3/1990 | Legge et al. | |
| 4,954,387 A | 9/1990 | Sikorski | |
| 5,313,034 A | 5/1994 | Grimm et al. | |
| 5,466,506 A | 11/1995 | Freitas et al. | |
| 5,876,540 A | 3/1999 | Pannell | |
| 6,088,985 A | 7/2000 | Clark | |
| 6,426,029 B1 | 7/2002 | Hiscock et al. | |
| 6,517,658 B1 | 2/2003 | Wageman et al. | |
| 8,141,606 B2 | 3/2012 | Benzing, II et al. | |
| 2002/0109348 A1 | 8/2002 | Pfeiffer | |
| 2003/0075919 A1 | 4/2003 | Schulte-Ladbeck et al. | |
| 2004/0057782 A1 | 3/2004 | Okamoto et al. | |
| 2004/0185213 A1 | 9/2004 | Skelton et al. | |
| 2005/0102968 A1 | 5/2005 | Long et al. | |
| 2005/0186390 A1 | 8/2005 | Bersuch et al. | |
| 2005/0230361 A1 | 10/2005 | Wang et al. | |
| 2005/0269823 A1 | 12/2005 | DeVoursney et al. | |
| 2008/0149276 A1 | 6/2008 | Sprott et al. | |
| 2008/0274326 A1 | 11/2008 | Kim et al. | |
| 2010/0159196 A1 | 6/2010 | Naritomi et al. | |
| 2012/0276320 A1 | 11/2012 | Zalewski et al. | |
| 2013/0052392 A1 | 2/2013 | Radlmayr et al. | |
| 2013/0266793 A1 | 10/2013 | Robertshaw | |
| 2013/0287481 A1 | 10/2013 | Hardy | |
| 2013/0288036 A1 | 10/2013 | Schulze et al. | |
| 2014/0016993 A1 | 1/2014 | Itoh | |
| 2014/0205800 A1 | 7/2014 | Raghavendran et al. | |
| 2014/0334868 A1 | 11/2014 | Apfel | |
| 2016/0318239 A1 | 11/2016 | Silvanus et al. | |

FOREIGN PATENT DOCUMENTS

| | | | |
|---|---|---|---|
| FR | 2742691 A1 | | 6/1997 |
| JP | 04-135720 A | | 5/1992 |
| JP | 11-090986 | * | 6/1999 |
| JP | 2003-145625 | * | 5/2003 |
| JP | 2003145625 A | | 5/2003 |
| JP | 2013-043770 A | | 3/2013 |
| WO | 2012140058 A2 | | 10/2012 |

OTHER PUBLICATIONS

EP Search Report (dated May 19, 2015) (EP 14 00 4303).
EP Search Report (dated May 26, 2015) (EP 14 00 4302).
U.S. Appl. No. 14/974,949, filed Dec. 18, 2015.

* cited by examiner

COMPONENT HAVING AN INTEGRAL BOND AND A JOINING METHOD

FIELD OF INVENTION

The invention relates to a component comprising at least two interconnected plastics component parts, and to a corresponding joining method.

BACKGROUND OF THE INVENTION

In different industrial fields of application, the task of interconnecting different plastics component parts is an ever recurrent one. In this respect, gluing and welding methods are preferably used. In fibre-reinforced plastics materials, the result is often that there is no fibre reinforcement in the connection region, i.e. in the region where the glued or welded surface is located. The strength of the fibre-reinforced plastics material results from the combination of the matrix plastics material and the fibres embedded therein. Owing to the lack of fibres in the connection region, a welded component has a reduced load-bearing capacity, in particular tensile strength, at this point. To reduce this problem, the glue joints are conventionally designed to be over a larger surface area or supplementary securing means, e.g. "chicken rivets", are used. Rivets are termed chicken rivets when they would not actually be necessary when there is a sufficiently sturdy bond in which the connection strength of a glue joint corresponds to the strength of the base material.

WO 2011/069899 A2 discloses a joining method in which a metal sheet is integrated in the connection zone and protruding portions or anchoring pins grip into the adjacent plastics material on either side in order to thus obtain meshing which improves the connection of the glued or welded surfaces.

BRIEF SUMMARY OF THE INVENTION

One of the ideas of the invention is to provide an improved method for joining plastics parts, at least one of the plastics parts being fibre-reinforced. This method should increase the load-bearing capacity of the connection region and as far as possible there should be no weakening of the overall material strength.

In a welding method for producing an integral bond of a first and a second plastics part in a connection region, at least the first plastics part is fibre-reinforced by a plurality of directional fibres, and a welding head is brought into contact with the first plastics part, and the plastics material is made to soften and/or melt in the connection region so that the welding head can penetrate the first plastics part. The connection region is in particular adjacent to one end of the first plastics part, so that reinforcing fibres can extend from said end into the connection region by means of appropriate heating. Alternatively or additionally, the plastics material adjacent to the connection region is heated, in that reinforcing fibres can also reorient themselves outside the connection region in order to allow the welding head to penetrate the first plastics part without generally breaking or severing the reinforcing fibres. Conventionally, welding by means of friction welding using fibre-reinforced plastics materials was mainly possible when the fibres were short, having a length of less than 3 mm. If a welding tool had tried to penetrate a fibre-reinforced workpiece having directional fibres, the welding tool would have destroyed these fibres. By means of the two above-mentioned methods, the plastics parts are welded together without the fibres being excessively broken or severed. Excessive breakage or severing of the fibres occurs in particular when more than 50% of the fibres break within the connection region.

A softening zone is produced in the longitudinal direction of the reinforcing fibres from the connection region as far as to an end of the first plastics part, and fibres are extended out of the softening zone into the connection region during welding. The fibre material outside the connection region towards the adjacent end of the workpiece, which is not loaded during insertion of the plastics part, has no functional significance. It is thus advantageous for the fibre material to extend out of this region in order to reduce tensile and/or flexural and/or shearing loads on the reinforcing fibres in the connection region during the welding.

In at least one region of the first plastics part that is remote from the welding head by more than half the diameter of the welding head and is in particular remote from the welding head by more than the diameter of the welding head, the plastics material can be heated by means of a heat source to a temperature between its softening and melting point or at least to 5% below the softening point. The connection region may be the region in which the welding head penetrates the material and/or where the form fit is located. The embedding resistance of the reinforcing fibres in the plastics material already decreases below the softening point, and so the reinforcing fibres can change position without severing. For example, heating is performed to at most 5° below the melting point.

Energy may be supplied to achieve a necessary temperature increase in the welding region, and heating is carried out, in particular at least at a region that adjoins the weld region and is at least double the size of the welding head cross section, in order to bring the first plastics part into the softening point range in this region, and in doing so the temperature remains below the melting point. The energy supplied is in particular not kinetic energy or not only kinetic energy, e.g. frictional energy from a friction welding method. In addition, the welding head can introduce energy in a rotating or oscillating manner.

In particular, reinforcing fibres of the first plastics part can be pressed into the second plastics part at least in some portions by the welding head. In this case, the geometry of the second plastics part, into the region of which the reinforcing fibres of the first plastics part are pressed, is considered prior to welding. This results in optimum anchoring of the first plastics part in the second plastics part. When the second plastics part is also fibre-reinforced, owing to its close spatial proximity to the reinforcing fibres, good anchoring is produced to the point of creating cross-linking of the reinforcing fibres.

The welding head can be driven by a rotating and/or vibrating movement. As a result, heat is introduced into the connection region and the movement assists the displacement movement of the reinforcing fibres in order to thus get out of the way of the welding head without the reinforcing fibres breaking.

The welding head can be withdrawn from the material of the first plastics part at least in part at repeated intervals, then moved along a weld track by at least 0.1 mm or preferably by at least 20% of the welding head diameter, and then lowered back into the material of the first plastics part. A continuous weld track is thus gradually produced. In the case of an overlapping welding arrangement in relation to the connection partner, the reinforcing fibres are deflected.

Advantageously, a pressure pad may be arranged around the periphery of the welding head and is in surface to surface contact with the first plastics part. During the deformation of the reinforcing fibres, the pressure pad can be stationary relative to the first plastics part. The pressure pad ensures that the matrix portion remains in the connection region and does not accumulate locally.

A component comprises two plastics parts connected in a connection region, wherein at least a first plastics part is fibre-reinforced and the reinforcing fibres are largely oriented linearly within the first plastics part and at least some of the reinforcing fibres comprise deviations in the connection region which deviate from said linear orientation. This arrangement is a result of the described joining method. The fibres can also be oriented or deflected towards the connecting joining partner.

The first plastics part can also comprise a certain content of long-fibred reinforcing fibres and fibre breakage occurs in the connection region when there is less than 40% of these reinforcing fibres. It may not be possible to completely prevent fibre breakages, and so accordingly there remains a high content of undamaged fibres which can absorb the loads.

BRIEF DESCRIPTION OF THE DRAWINGS

In the following, some embodiments of the invention will be described in more detail on the basis of schematic drawings, in which.

DETAILED DESCRIPTION

Figure 1:
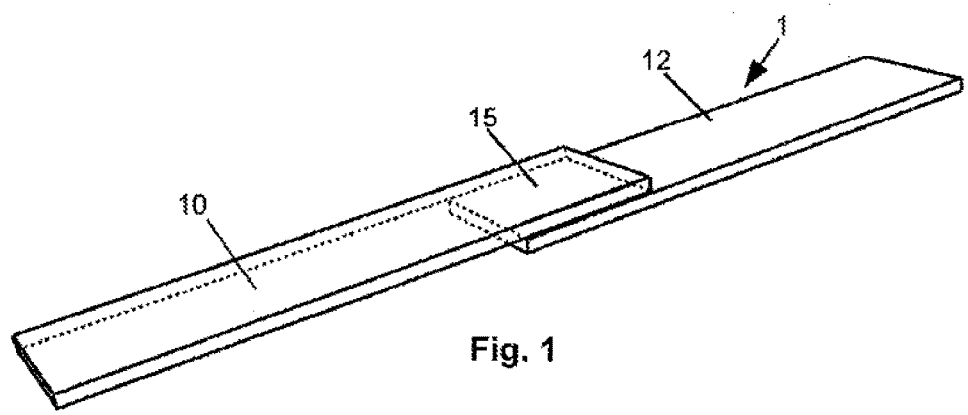
FIG. 1 is a perspective view of two plastics component parts that are interconnected to form a component.

FIG. 1 shows two plastics parts 10 and 12 of a component 1. The component 1 can be a component used in aviation. For example, it can in particular be a flap, such as a landing flap, of an aircraft. In the preferred embodiment, the components consist of a thermoplastic and are both fibre-reinforced. As will be explained below, the advantages according to the invention can already be achieved when at least one of the plastics parts 10, 12 is fibre-reinforced.

Figure 2:
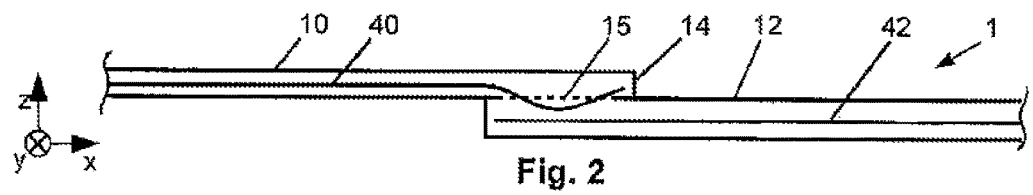
FIG. 2 is a side view of the component shown in FIG. 1.

FIG. 2 is a side section through the component 1 according to FIG. 1. A fibre reinforcement 40, 42, which can for example consist of carbon fibres or glass fibres, is present in each of the two plastics parts 10, 12. The illustration is schematic because, in real components, there is generally no inner fibre layer that is surrounded on either side by a fibreless plastics layer (as it appears in the drawings). Instead, the plastics parts 10, 12 preferably have a high fibre content, which can for example be 50% or up to 80% and is distributed largely uniformly within the plastics parts 10, 12. With this is mind, the following embodiments should be understood schematically.

FIG. 2 shows how, in the welded component 1, reinforcing fibres 40 of the first plastics part 10 are arranged into the plastics part 14 within an overlap region of the two plastics parts 10, 12. During the welding operation, a welding head 50 was pressed into the material from above, i.e. in the negative z-direction, and thus causes the fibres to compact downwards, and as a result the fibre content in the lower plastics part 12 was increased by fibres 40 of the first plastics part being displaced downwards. Thus, the matrix portion, i.e. the plastics portion, was in turn raised vertically, i.e. in the z-direction above the connection region 15.

The weld will be explained in more detail by means of FIGS. 3 and 4. A weld seam is produced by the welding head 50 being moved along the overlap region of the plastics parts 10, 12 in the direction of the movement direction v. A pressure pad 54 that presses with a predefined pressure onto the packing of the two plastics parts 10, 12 from above, i.e. in the negative z-direction, is arranged around the welding head 50. This first ensures that the plastics parts 10, 12 rest one on top of the other without any gaps. In addition, a liquid flow of the molten plastics material results from the welding process and the pressure pad 54 ensures that this plastics material cannot escape from the weld region.

In a preferred embodiment, the welding head is round and driven in a rotating manner. As a result, firstly kinetic energy is introduced into the weld region, which energy is then converted into heat according to the principle of friction welding. As will be described further below, extra heat can be introduced in addition. Alternatively, the welding head can be moved in the thickness direction (i.e. z-direction according to FIG. 2) in an oscillating manner. A piezo drive is suitable for this. Stroke lengths of less than 0.1 mm are advantageous. Other oscillation directions, such as in the x- or y-direction, are also possible. The welding head can also have other cross-sectional geometries, e.g. rectangular or square, etc.

Figure 3:
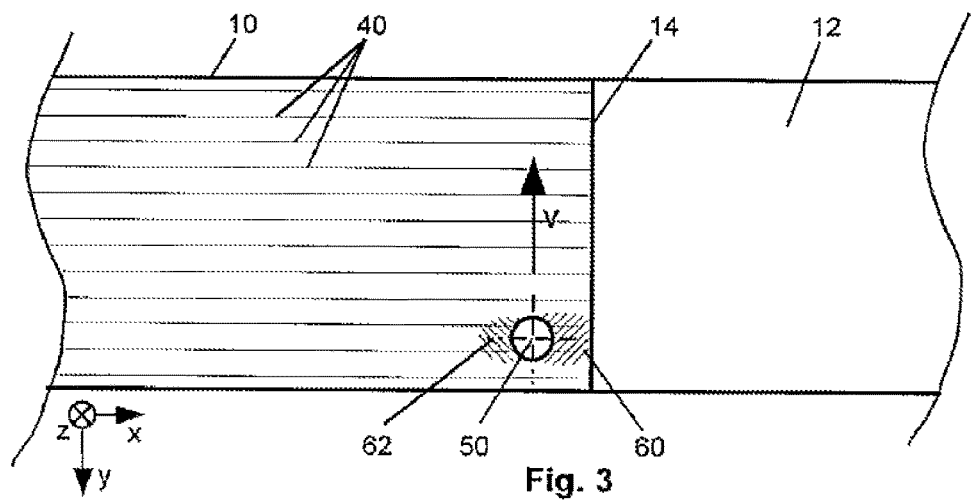
FIG. 3 is a plan view of the two plastics component parts 10, 12 of the component according to FIG. 1, a welding head 50 being indicated but without also showing the drive device 55 thereof.
Figure 4:
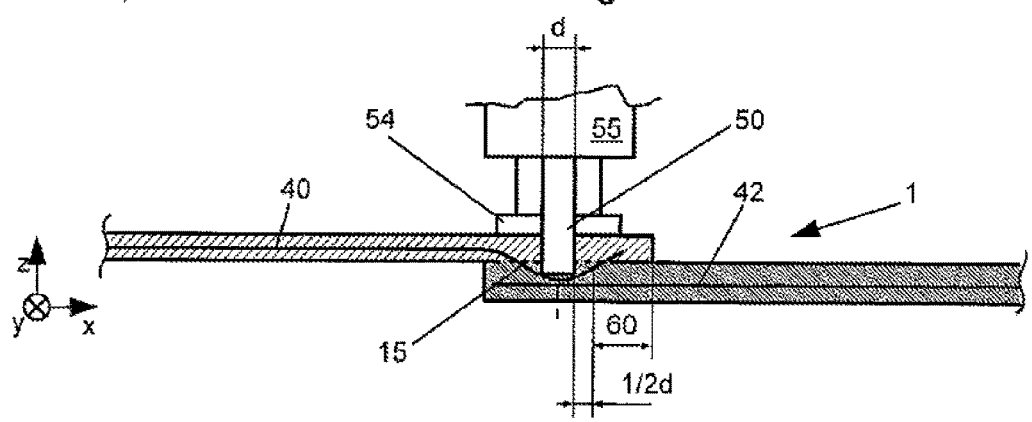
FIG. 4 is a side view in the form of a partial section through the welding device during welding.

FIG. 3 shows that the fibres 40 of the first plastics part 10 are perpendicular to the connection zone, which corresponds to the overlap direction of the two plastics parts 10, 12. The extension of the connection zone is shown by the arrow v of the movement direction of the welding head 50. Other angular orientations of the reinforcing fibres are also possible. Different preferred orientations of the fibres 40 can also be used, e.g. a plurality of fibres which are for example perpendicular to one another and are each at a 45° angle to the x-direction.

As already mentioned, the welding head 50 presses into the plastics material during welding. In addition to the heating, which can be introduced in the form of kinetic energy by means of the welding head 50, an additional heat source can also be used. Said source can for example be an infrared radiator or inductive methods which take advantage of the conductivity of the plastics fibres. The welding head can for example also be heated electrically. The welding head 50 can be lowered to such an extent that its end dips at least slightly into the lower, i.e. the second plastics part 12. The welded connection is created in this way. The region in which the weld is integrally bonded is termed the connection region 15 in the following. In conventional welds, specifically and preferably only this connection region 15 is heated. In the present method, the plastics material is also heated.

On one hand, the region denoted as the first softening zone 60 according to FIG. 3 can be heated. The first softening zone 60 extends from the connection region 15 in the area surrounding the tool 50 as far as to the adjacent edge or end of the plastics material. During use of the component 1, this region is not subject to any mechanical loads since loads exerted on the first plastics part 10 are dissipated by means of the connection region 15 or the welded connection zone. Preferably, the first softening zone 60 is heated to the softening point. Practically all thermoplastics have a softening point. At this temperature, the strength, in particular the tensile strength or indentation resistance, significantly decreases, while the shape is maintained as the melting point has not yet been reached. If PEEK is used as the matrix material, the softening point is 305° C. and the melting point is 340° C. Accordingly, the material for the welding is brought to the temperature of 340° C. by the kinetic energy of the welding head and/or the supplied heat energy. The first softening zone 60 is brought to a temperature of between 305° C. and 330° C. Alternatively, the temperature can also be just 290° C. (or more), since the strength is already reduced below the softening point. The aim behind softening the first softening zone 60 is to locally reduce the strength of the connection of the reinforcing fibres 40 to the matrix material of the plastics part 10. As a result, when force is exerted by the welding head 50, the reinforcing fibres 40 will not sever or break, but rather are deflected downwards. As a result, the reinforcing fibres 40 can be pushed through downwards, i.e. towards the second plastics part 12, as shown in FIG. 4. The fibre content in the connection region 15 of the two plastics parts 10, 12 is thereby increased. Excess matrix material can be conducted away upwards. The fibre content directly below the pressure pad 54 is thus significantly reduced. To allow the reinforcing fibres 40 to be deflected as shown in FIG. 4, in the softening zone some of the fibres shift towards the connection region 15. This shifting can be seen inter alia in FIG. 3 since, on the right next to the welding head 50, the fibres no longer abut the end of the plastics part (in the x-direction). In the portions that have not yet been welded, i.e. in the positive v-direction, the ends of the reinforcing fibres 40 still terminate at the end 14 of the first plastics part 10.

As an alternative and/or in addition to heating the plastics material in the first softening zone 60, the plastics material can be heated at the second softening zone 62. The second softening zone 62 is located away from the connection region in the direction of the longitudinal extension of the reinforcing fibres and in the direction away from the end 14 of the first plastics part 10. This heating can be within the same temperature range as the aforementioned heating of the first softening zone 60. If this heating were not carried out, a steep temperature differential could possibly occur. In other words, the reinforcing fibres 40 would then be rigidly embedded in the plastics material at a relatively small distance from the connection region 15. The penetration of the welding head 50 into the material would produce high flexural or shearing forces on the reinforcing fibres 40 and, since the flexural strength of e.g. carbon fibres is rather low, breakages might occur. Said temperature increase allows the fibres to reorient themselves within the first plastics part, and so the flexural and/or shearing load is reduced as a result and no fibre breakage occurs. The first and second softening zones do not have to begin directly at the edge of the welding head 50. Rather, the region in which the targeted temperature control is intended, i.e. in the first and second softening zone 60, 62, can be remote from the welding head 50 by more than half the diameter d of the welding head 50, as shown in FIG. 4 with regard to the first softening zone 60.

Owing to the above-described method, said reinforcing fibres 40 of the first plastics part 10 and the reinforcing fibres 42 of the second plastics part 12 are directly next to one another, and so the result is optimum transmission of the forces that can occur when the component 1 is in use.

Figure 5:
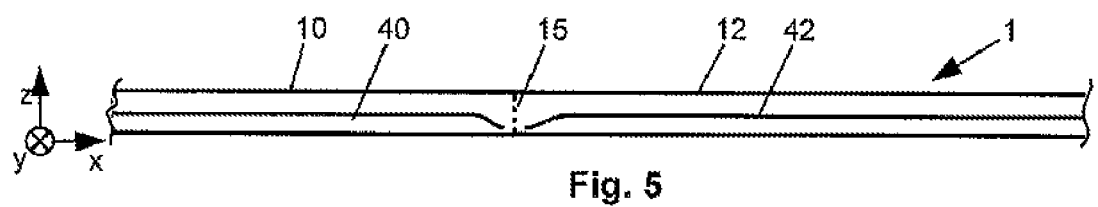
FIG. 5 is the side view of a weld on two plastics parts that are butt jointed.

Whereas above an overlapping connection has been explained, FIG. 5 shows a butt-joint arrangement. Between the first and second components 10, 12, the connection region 15 thereof is shown by a dashed line. The welding head 50 is preferably guided precisely along this connection region 15. By means of a corresponding temperature control, the reinforcing fibres 40, 42 are able to reorient themselves within the plastics parts 10, 12, and so the shown connection having the corresponding fibre orientation is produced following welding.

The casing geometry of the welding head 50 is preferably flat. The shape can preferably be cylindrical. The end face of the (cylindrical) geometry can also be pointed. This can also assist the fibres in rearranging themselves not only in the z-direction, i.e. the thickness direction, but also to the side, i.e. in the plane perpendicular thereto. In alternative embodiments, the shape of the welding head 50 can be convex, i.e. can be a protruding region in a central region of the lateral surface. This region does not comprise any sharp edges, but instead rounded portions in order to damage the fibres as little as possible. The diameter d of the welding head can for example be 3 mm. Alternatively, said diameter can also match the thickness of the first plastics element 10, it also being able to be within the tolerance range of +/−30%. The distance from the central longitudinal axis of the welding head to the adjacent end 14 of the first plastics part is preferably in the range of from twice to ten times the diameter d.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A welding method for producing an integral bond of a first and a second plastics part in a connection region, the method comprising:
    reinforcing at least the first plastics part by a plurality of directional fibres;
    providing an overlap region in which the first plastics and the second plastics part overlap;
    bringing a welding head being into contact with the first plastics part in the overlap region;
    softening and/or melting the plastics material in the connection region adjacent to one end of the first plastics part so that the welding head can penetrate the first plastics part and the reinforcing fibres can extend from said end into the connection region by appropriate heating.

2. The welding method according to claim 1, wherein a softening zone is produced in the longitudinal direction of the reinforcing fibres from the connection region as far as to an end of the first plastics part, and fibres are extended out of the softening zone into the connection region during welding.

3. The welding method according to claim 1, wherein, in at least one region of the first plastics part that is remote from the welding head by more than half the diameter of the welding head, the plastics material is heated by a heat source to a temperature between a softening point of the plastics material and a melting point of the plastics material or at least to 5% below the softening point.

4. The welding method according to claim 3, wherein the at least one region of the first plastics part is remote from the welding head by more than the diameter of the welding head.

5. The welding method according to claim 1, wherein energy is supplied to achieve a necessary temperature increase in the welding region, and heating is carried out to bring the first plastics part into the softening point range in the welding region, and in doing so remains below the melting point.

6. The welding method according to claim 5, wherein the heating is carried out at a region that adjoins the weld region and is at least double the size of the welding head cross section.

7. The welding method according to claim 1, wherein the reinforcing fibres of the first plastics part are pressed into the second plastics part at least in some portions by the welding head.

8. The welding method according to claim 1, wherein the welding head is driven by a rotating and/or vibrating movement.

9. The welding method according to claim 1, wherein the welding head is removed from the material of the first plastics part at least in part at repeated intervals, then moved along a weld track by at least 0.1 mm, and then lowered back into the material of the first plastics part.

10. The welding method according to claim 9, wherein the welding head is moved along a weld track by at least 20% of the welding head diameter.

11. The welding method according to claim 1, wherein a pressure pad is arranged around the periphery of the welding head, is in surface to surface contact with the first plastics part and is arranged in a stationary manner relative to the first plastics part.

12. The welding method according to claim 11, wherein the pressure pad is arranged in a stationary manner relative to the first plastics part during the deformation of the reinforcing fibres.

13. A welding method for producing an integral bond of a first and a second plastics part in a connection region, the method comprising:
   reinforcing at least the first plastics part by a plurality of directional fibres;
   providing an overlap region in which the first plastics and the second plastics part overlap;
   bringing a welding head being into contact with the first plastics part in the overlap region;
   softening and/or melting the plastics material adjacent to the connection region so that the welding head can penetrate the first plastics part and the reinforcing fibres can reorient themselves outside the connection region to allow the welding head to penetrate the first plastics part without the reinforcing fibres generally breaking or severing.

14. The welding method according to claim 13, wherein a softening zone is produced in the longitudinal direction of the reinforcing fibres from the connection region as far as to an end of the first plastics part, and fibres are extended out of the softening zone into the connection region during welding.

15. The welding method according to claim 13, wherein, in at least one region of the first plastics part that is remote from the welding head by more than half the diameter of the welding head, the plastics material is heated by a heat source to a temperature between a softening point of the plastics material and a melting point of the plastics material or at least to 5% below the softening point.

16. The welding method according to claim 15, wherein the at least one region of the first plastics part is remote from the welding head by more than the diameter of the welding head.

17. The welding method according to claim 13, wherein energy is supplied to achieve a necessary temperature increase in the welding region, and heating is carried out to bring the first plastics part into the softening point range in the welding region, and in doing so remains below the melting point.

18. The welding method according to claim 17, wherein the heating is carried out at a region that adjoins the weld region and is at least double the size of the welding head cross section.

19. The welding method according to claim 13, wherein the reinforcing fibres of the first plastics part are pressed into the second plastics part at least in some portions by the welding head.

20. The welding method according to claim 13, wherein the welding head is driven by a rotating and/or vibrating movement.

21. The welding method according to claim 13, wherein the welding head is removed from the material of the first plastics part at least in part at repeated intervals, then moved along a weld track by at least 0.1 mm, and then lowered back into the material of the first plastics part.

22. The welding method according to claim 21, wherein the welding head is moved along a weld track by at least 20% of the welding head diameter.

23. The welding method according to claim 13, wherein a pressure pad is arranged around the periphery of the welding head, is in surface to surface contact with the first plastics part and is arranged in a stationary manner relative to the first plastics part.

24. The welding method according to claim 13, wherein a pressure pad is arranged in a stationary manner relative to the first plastics part during the deformation of the reinforcing fibres.

* * * * *